Dec. 28, 1948.  E. P. NEHER  2,457,706
RESILIENT MOUNTING
Filed Sept. 6, 1945   2 Sheets-Sheet 1

INVENTOR.
Eldon Paul Neher
BY
Evans + McCoy
ATTORNEYS

Dec. 28, 1948.  E. P. NEHER  2,457,706
RESILIENT MOUNTING

Filed Sept. 6, 1945  2 Sheets-Sheet 2

INVENTOR.
Eldon Paul Neher
BY
Evans & McCoy
ATTORNEYS

Patented Dec. 28, 1948

2,457,706

UNITED STATES PATENT OFFICE 2,457,706

RESILIENT MOUNTING

Eldon Paul Neher, North Manchester, Ind., assignor to The General Tire & Rubber Company, Akron, Ohio, a corporation of Ohio Application September 6, 1945, Serial No. 614,762

11 Claims. (Cl. 248—358)

This invention relates to vibration-insulating mountings and particularly to vibration-insulating mountings of simplified construction having freedom of movement in several directions.

It is an object of the present invention to provide a mounting which is of relatively low cost and which has characteristics to more effectively isolate vibrations in vibrating machinery.

It is another object of the present invention to provide a mounting for vibrating machinery and the like which utilizes a rubber-like material for vibration insulation and may be easily produced without the necessity of vulcanizing the rubber-like material to metal.

It is a further object of the present invention to provide a vibration-insulating mounting which combines the effects of rubber under tension and compression with the damping action of frictional movement between rubber and a rigid surface.

Other objects will be apparent from the following description of the invention as illustrated by the accompanying drawing, in which.

Figure 1:
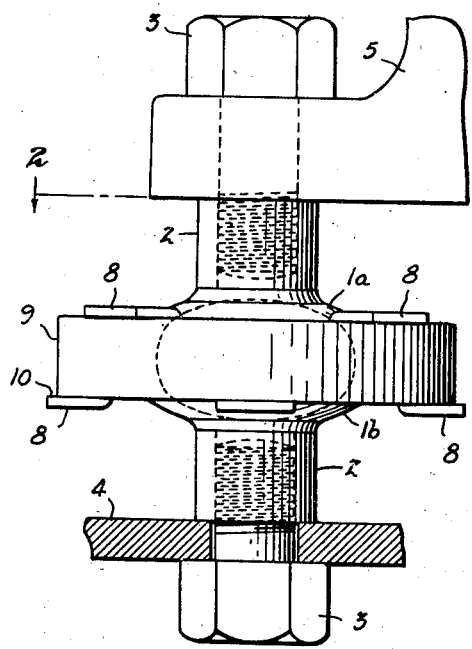
Figure 1 is an elevational view of a mounting embodying the present invention showing portions of each of two relatively vibratable members attached thereto.
Figure 2:
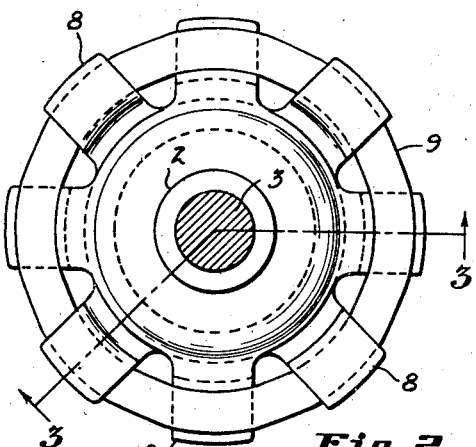
Fig. 2 is a plan view of a mounting embodying the present invention as viewed from line 2—2 of Fig. 1.
Figure 3:
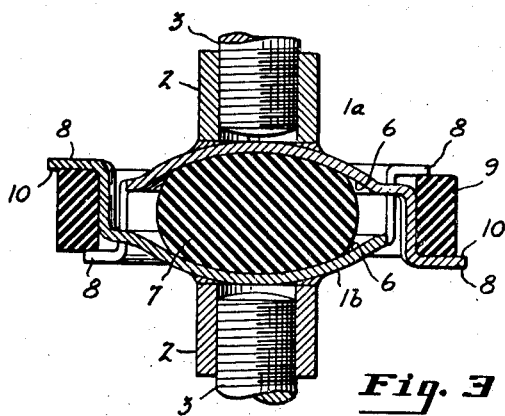
Fig. 3 is a sectional view through a mounting embodying the present invention along the line 3—3 of Fig. 2.

Vibration-insulating mountings of the present invention utilize as a main load-sustaining resilient member a block, preferably a ball, of vulcanzed rubber-like material. The resilient member has disposed on each of two opposite sides thereof a rigid member with a relatively wide bearing surface bearing against said block. Each of the two rigid members carries attaching means for attachment to one of two relatively vibratable members and a plurality of spaced fingers which preferably extend outwardly and forwardly to a peripheral diameter substantially larger than that of the bearing surface. The fingers of each of the rigid members are adapted to be arranged in inter-fingering relation with the fingers of the other rigid members. Resilient interlocking means, which may be an annulus of resilient material, is provided to cooperate with the fingers and form a resilient external interlock that retains the bearing surfaces of the rigid members against the resilient material and in position on opposite sides of the block.

The resilient interlocking member is an important feature in the operation of the mounting as it permits variation in the characteristics of the mounting and it is adapted by frictional movement or shear strain to greatly increase the damping characteristics of the mounting. The relatively wide bearing surface is preferably of greater area than the projected area of the block thereon so that the deflection characteristics of the mounting are subject to relatively greater change as the degree of deflection is increased.

Referring more particularly to the drawing, wherein like parts are indicated by like numerals of reference throughout the several views, my improved mountings have two rigid members 1a and 1b, each having attaching means such as a tubular threaded portion 2, adapted to cooperate with a bolt 3 for making connection to one of the two relatively vibratable members, such as the mounting member 4 or the mounted member 5, as desired. Each of the rigid members 1a and 1b has a bearing surface 6 which is preferably concave and preferably disposed centrally and in the region of an end portion thereof. As shown in the drawing, the attaching or connecting means 2 is disposed on the opposite side of the rigid members from the bearing surface 6. The central portion of the bearing surface also preferably intersects the axis of the connecting means 2 and 3. The ball or block of vulcanized rubber-like material 7, such as a vulcanized natural or synthetic rubber-like compound having resilience or flexibility generally characteristic of soft rubber compounds, is centrally disposed between bearing surfaces 6 of the rigid members 1a and 1b so that each of the opposite sides thereof contact or bear against a bearing surface 6 of one of the rigid members. It, therefore, prevents the bearing surfaces 6 of the two members from being forced into contact with each other, and insures that relative movement between the connectors 1a and 1b is accompanied by simultaneous deformation of the mass of resilient material 7. Greatly superior operating characteristics are also had when the bearing surfaces 6 with which contact the ball 7 are of concave shape with a radius of curvature larger than the normal radius of curvature of the surfaces of the ball 6 against which they may bear.

Resilient external locking means is provided for retaining the component parts of the mounting together with the bearing surfaces 6 of each of the connectors bearing on oppositely disposed portions of the central ball or block of resilient material 7. As shown the resilient external locking means comprises angularly spaced fingers or flanged portions 8, which are rigidly carried by each of rigid members 1a and 1b and which are arranged in interfingering relationship, and a resilient locking member 9 which cooperates with the fingers to prevent separation of those carried by one rigid member from those carried by the other rigid member without distortion thereof. The angularly spaced flanged members 8, carried by each of the connectors 1a and 1b, preferably extend substantially beyond the bearing surface 6 thereof so that the locking annulus 9 is of sufficient width to have substantial shear strength. An annulus of rectangular section, proportioned as illustrated in the drawing, is preferred. The ball or block 7 of resilient material may be solid or central portions thereof may be omitted to retain gaseous fluid under pressure.

Figure 4:
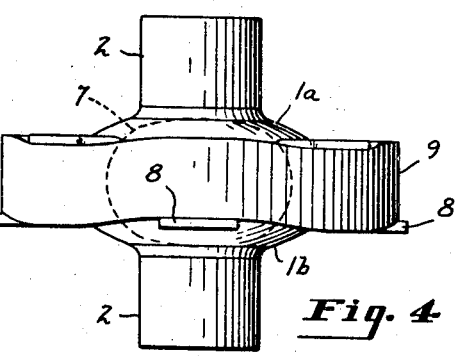
Fig. 4 is an elevational view of the mounting illustrated in Figs. 1, 2 and 3, showing the mounting in a free unloaded state.

The operation of the form of mountings may be seen by comparing Figs. 1 and 4. The resilient ball, which may or may not be bonded to portions of the surface 6, permits relative movement of the connecting members 1a and 1b and of the mounting and mounted members 4 and 5 by distortion of the mass 7. Movement of the mounted member relative to the mounting member in a direction parallel to the axis of the bolt 3 is by compression and elongation of the resilient ball 7; whereas movement in planes perpendicular to the axis may be by rolling action. By comparing Figs. 1 and 4 it may readily be seen that change in peripheral length of the resilient annulus 9 of the locking means must occur upon relative movement of the connectors 1a and 1b. This movement provides both a friction damping on portions of the bearing surfaces of the flanged portions 8 which contact the locking annulus 9 as well as damping imposed by shear strain of the annulus 9. By changing the curvature of the bearing surfaces 6 or by changing curvature of the surfaces of the resilient material 7 which are adapted to bear against or contact the convex surfaces 6, one is able to substantially vary the characteristics of the mounting to accommodate the desirable commercial applications.

Figure 5:
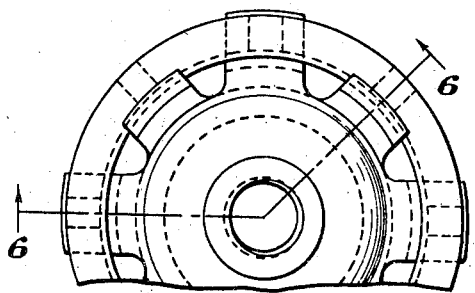
Fig. 5 is a plan view of a portion of a modified form of mounting embodying the present invention.
Figure 6:
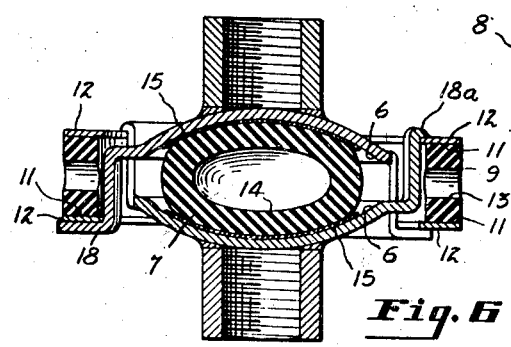
Fig. 6 is a sectional view on the line 6—6 of Fig. 5.
Figure 7:
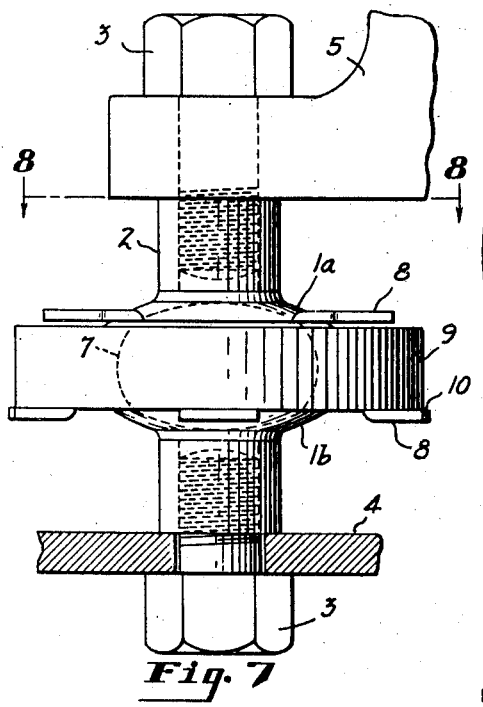
Fig. 7 is an elevational view of a preferred form of mounting of the present invention showing portions of each of two relatively movable or vibratable members attached thereto.
Figure 8:
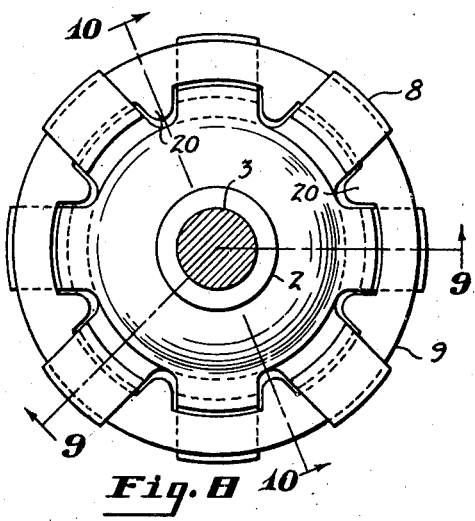
Fig. 8 is a plan view of the mounting shown in Fig. 7 as viewed from line 8—8 of Fig. 7.
Figure 9:
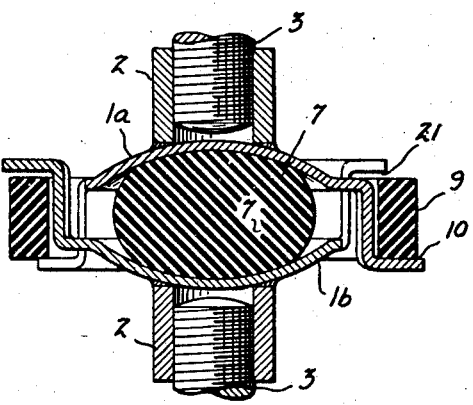
Fig. 9 is a sectional view on the line 9—9 of Fig. 8.
Figure 10:
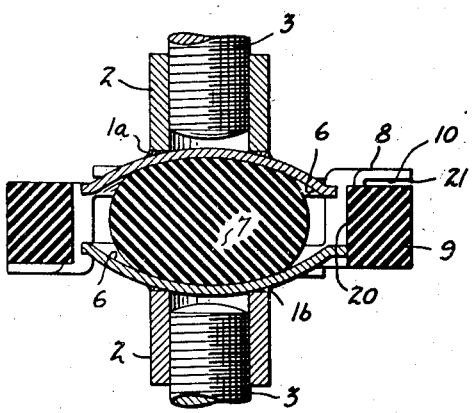
Fig. 10 is a sectional view on the line 10—10 of Fig. 8.

In the modification illustrated in Figs. 5 and 6, the external locking means, instead of being provided with the intermittently spaced locking surfaces 10 on the spaced flanged portions, is provided with continuous locking surfaces 11. The locking surfaces 11 may be a surface of each of the metal washers 12 carried by the angularly spaced flanged portions 18 and 18a, which are also arranged in interfingering relationship. It is usually preferred that the locking member 9 be a continuous annulus. However, a portion or one or more spaced portions of an annulus may be removed to provide smaller blocks of resilient material and obtain increased flexibility to more effectively absorb or insulate vibrations in certain directions, as desired for certain commercial applications. In case the angularly spaced portions of the annulus 9 are removed, it is desirable that one of the opposite axial surfaces of the resilient material be adhered to each of the surfaces 11 by suitable means, as by vulcanization thereto.

If desired, radially extending, angularly spaced openings 13 may be provided within the annulus 9 to facilitate deformation thereof when compressive forces are applied to the resilient ball 7 through the rigid members or connectors 1a and 1b.

The resilient block or ball 7 may be solid or central portions may be omitted to provide a central opening 14 to retain fluid or gas therein. While it is not usually desirable to adhere the resilient ball 7 to the bearing surfaces 6, suitable adhesion by the rubber-to-metal adhesive 15 may be had if desired.

In the preferred modification illustrated in Figs. 7 to 10, inclusive, the mountings are provided with means such as one or more lugs or projections 20 of resilient material which extend between adjacent fingers 8 for preventing a portion of a finger 8 carried by the rigid member 1a from making metal-to-metal contact with a portion of a finger 8 carried by the rigid member 1b when the members 1a and 1b are subjected to relatively angular stress, such as stress tending to cause relative axial movement about the axis of the bolts 3. The resilient projections are preferably carried by the resilient interlocking annulus 9 and preferably extend inwardly between adjacent fingers as shown from an inner peripheral portion of the annulus.

The proportions of the component parts of the mounting are preferably selected to permit the locking annulus 9 to be freely floating (not subject to shear between the two sets of fingers 8) when the mounting is in the loaded static state. Thus, the height or axial thickness of the resilient locking member 9, the thickness of the ball or block of rubberlike vulcanized material 7, and the distances between the locking surfaces 10 of the sets of fingers 8 are preferably proportioned to provide a free space 21 between the bearing surface 10 of one of the sets of fingers and the adjacent surface of the resilient member 9 when the mounting is in the loaded condition. The member 9 is, therefore, adapted to remain in the undeformed state under normal conditions and comes into play as a frictional absorber or as a snubber for large vibrations that may occur at or near the critical frequency of the system.

It is to be understood that variations and modifications of the specific devices herein shown and described for purposes of illustration may be made without departing from the spirit of the invention.

What I claim is:

1. A vibration-insulating mounting adapted to be disposed between two relatively vibratable members comprising two rigid connectors, each having attaching means for attachment to one of said relatively vibratable members and a centrally disposed bearing surface, said connectors arranged with said bearing surfaces directed toward each other, a mass of vulcanized rubber-like material disposed between said bearing surfaces with one of two opposite sides of said mass bearing against each of said bearing surfaces, and resilient external locking means carried by said connectors whereby relative movement of said connectors is accomplished only through distortion of said mass.

2. A vibration-insulating mounting comprising a ball of vulcanized rubber-like material, a rigid member having a concave surface on one side thereof disposed on opposite sides of said ball of resilient material with said concave surface bearing against said ball, said concave surface being of greater radius of curvature than the radius of curvature of said ball, connecting means carried by each of said rigid members and disposed at opposite sides thereof from said concave surfaces, angularly spaced flanged portions rigidly carried by each of said rigid members, said flanged portions being arranged in interfingering relationship, and a resilient locking member carried between the flanged portions of the two rigid members, whereby said rigid members may be moved relative to each other only through distortion of said resilient ball and of said locking member.

3. A vibration-insulating mounting comprising a ball of vulcanized rubber-like material, a rigid member having a concave surface on one side thereof disposed on opposite sides of said ball of resilient material with said concave surface bearing against said ball, said concave surface being of greater radius of curvature than the radius of curvature of said ball, connecting means carried by each of said rigid members, angularly spaced flanged portions rigidly carried by each of said rigid members, said flanged portions being arranged in interfingering relationship, and a resilient locking member carried between the flanged portions of the two rigid members, whereby said rigid members may be moved relative to each other only through distortion of said resilient ball and of said locking member.

4. The mounting of claim 3 wherein the resilient locking member is an annulus of rubber-like material.

5. The mounting of claim 3 wherein the resilient locking member is an annulus of rubber-like material and is retained under radial tension between said flanged portions when the mounting is in the unloaded state.

6. A vibration-insulating mounting comprising a block of vulcanized rubber-like material, a rigid member having a relatively wide bearing surface disposed on each of two opposite sides of said block with said surface bearing thereagainst, said rigid member carrying a plurality of spaced fingers arranged in interfingered relationship, and a resilient locking member resiliently connecting together the two sets of fingers so that they cannot be separated without distorting said locking member, each of said rigid members having means integral with said bearing surfaces for attachment to one of two relatively movable members, whereby relative movement of said relative movable members is accomplished through distortion of said block and said resilient locking member.

7. The mounting of claim 6 wherein the block is a ball and wherein the connection between the relatively movable members is made only through resilient material.

8. The mounting of claim 6 wherein the block is a hollow ball.

9. A vibration-insulating mounting comprising a block of vulcanized rubber-like material, two rigid members each having a relatively wide bearing surface and means for attachment to one of two relatively vibratable members, one of said rigid members being disposed on each of two opposite sides of said block with said bearing surface bearing thereagainst, said rigid members carrying a plurality of spaced fingers, fingers carried by one member being arranged in interfingering relationship with fingers carried by the other member, a resilient locking member resiliently connecting together the two sets of fingers so that they cannot be separated without distorting said locking member, and means for preventing metal-to-metal contact between interfingering portions of said spaced fingers when a force is applied to said rigid members, tending to cause relative axial rotation thereof, whereby relative movement of said vibratable members is accomplished through distortion of said block.

10. A vibration-insulating mounting comprising a block of vulcanized rubber-like material, two rigid members each having a relatively wide bearing surface and means for attachment to one of two relatively vibratable members, one of said rigid members being disposed on each of two opposite sides of said block with said bearing surface bearing thereagainst, said rigid members carrying a plurality of spaced fingers, fingers carried by one member being arranged in interfingering relationship, with fingers carried by the other member, a resilient locking member resiliently connecting together the two sets of fingers so that they cannot be separated without distorting said locking member, a projection of resilient material carried by said resilient locking member and extending between an interfingering portion of a finger carried by one of said rigid members and a next adjacent interfingering portion of another finger carried by the other of said rigid members to prevent a finger carried by one rigid member from coming into rigid contact with a finger carried by the other of said rigid members.

11. The mounting of claim 10 wherein the projection extending between the fingers is an integrally molded portion of said locking member and extends inwardly from an inner peripheral surface thereof.

ELDON PAUL NEHER.

REFERENCES CITED

The following references are of record in the file of this patent:

UNITED STATES PATENTS

| Number | Name | Date |
|---|---|---|
| 2,353,952 | Yerzley | July 18, 1944 |

FOREIGN PATENTS

| Number | Country | Date |
|---|---|---|
| 27,895 | France | May 27, 1924 |
| 339,891 | France | Apr. 28, 1904 |